United States Patent [19]

Wolter et al.

[11] Patent Number: 4,612,101

[45] Date of Patent: Sep. 16, 1986

[54] APPARATUS FOR THE ELECTROCHEMICAL ETCHING OF GROOVES OF VERY SMALL WIDTH

[75] Inventors: Bernd Wolter, Remscheid; Paul G. Pott, Wermelskirchen, both of Fed. Rep. of Germany

[73] Assignee: AEG Elotherm GmbH, Fed. Rep. of Germany

[21] Appl. No.: 737,315

[22] Filed: May 23, 1985

[30] Foreign Application Priority Data

May 25, 1984 [DE] Fed. Rep. of Germany ....... 3419503

[51] Int. Cl.$^4$ .......................... B23H 9/14; B23H 3/04; B23H 3/10
[52] U.S. Cl. .......................... 204/224 M; 204/129.55; 204/290 R
[58] Field of Search .......... 204/129.55, 224 M, 290 R

[56] References Cited

U.S. PATENT DOCUMENTS 3,268,434 8/1966 Weingartner .............. 204/129.55 X

FOREIGN PATENT DOCUMENTS 2600760 7/1977 Fed. Rep. of Germany ... 204/224 M
2656366 6/1978 Fed. Rep. of Germany ... 204/224 M Primary Examiner—Donald R. Valentine
Attorney, Agent, or Firm—Cushman, Darby & Cushman

[57] ABSTRACT

The invention relates to a process and an apparatus for the electrochemical etching of grooves of very small width, in particular smaller than 1.0 mm, into a workpiece. Etching is performed with a wire electrode or a rod electrode extending across the etching direction. In order that the electrolyte liquid introduced into the work gap does not flow away uncontrolled, but fills out the work gap over the entire working length of the electrode, a baffle acting behind the rear of the electrode is provided. This ensures that the flow of the electrolyte takes place essentially in the work gap and in the longitudinal direction.

6 Claims, 1 Drawing Figure

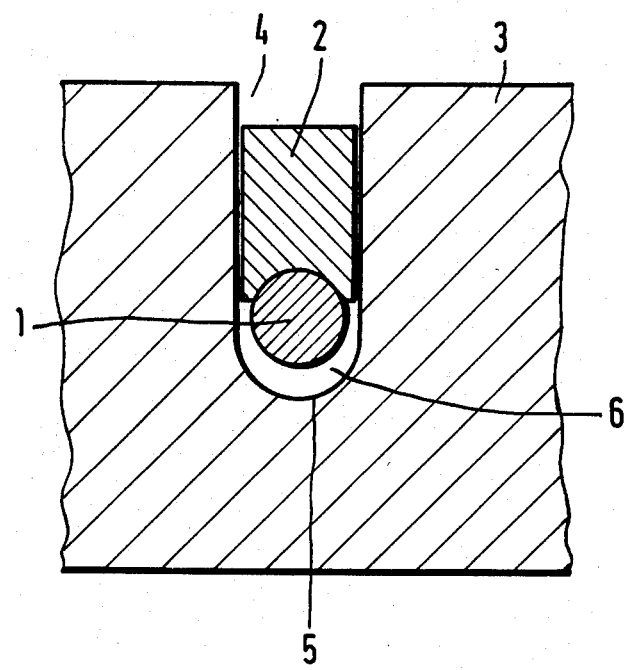

APPARATUS FOR THE ELECTROCHEMICAL ETCHING OF GROOVES OF VERY SMALL WIDTH

BACKGROUND OF THE INVENTION

1. Field of the Invention

The invention relates to a process for the electrochemical etching of grooves of very small width, in particular smaller than 1.0 mm, in a workpiece.

2. Description of the Prior Art

It is known in the electrochemical etching of grooves to use a flat electrode, the face of which opposite to the material to be carried away from the workpiece is exposed and the sides of which are covered by insulating material. With such electrodes, it is possible to make grooves of constant width over their entire height. However, it is not possible with such electrodes to make grooves below a minimum width. Since an adequate insulation of the sides of the electrode from the side walls of the grooves is only ensured when the insulating material has a minimum thickness of 0.2 mm, with insulation on both sides and the electrode element in between, the result is a minimum width which cannot be reduced any further than 1 mm.

SUMMARY OF THE INVENTION

The invention is based on the object of creating a process and an apparatus for the electrochemical etching of grooves of very small width, in particular less than 1 mm.

This object is achieved according to the invention in that the etching is performed by a wire electrode or a rod electrode extending across the etching direction. In the flowing away of the electrolyte liquid introduced into the work gap formed by the electrode the material to be carried away from the workpiece is hindered to such an extent that the work gap remains filled with electolyte liquid along its entire length. Thus, a flowing away of the electrolyte liquid takes place essentially in the longitudinal direction of the work gap.

This process can be implemented with an apparatus which is characterised in that on the rear of the electrode, there is arranged a baffle for the electrolyte liquid. This baffle extends over the entire working length of the electrode and is adapted in its width to the width of the groove and can be sunk into the workpiece together with the electrode. According to one development of the invention, this arrangement can involve the baffle being made of an insulating material and the electrode being arranged on the face of the baffle.

In the invention, the current supply arranged on the rear of the active electrode is dispensed with, and thus so too are the insulations, so that, from this side, there is no lower limit set on the width of the groove to be made. Providing for adequate electrolyte liquid in the work gap is the baffle which prevents a flowing away of the electrolyte liquid from the work gap into the already created space of the groove. It has been shown that gap widths of 0.4 mm can be readily made with the invention.

BRIEF DESCRIPTION OF THE DRAWING

The invention is explained in more detail below with reference to a drawing in which a cross-section through a workpiece during the electrochemical etching of a groove is shown.

DETAILED DESCRIPTION OF THE PREFERRED EMBODIMENT

A wire electrode 1, which is connected at the negative pole of a current source and which has a circular cross-section is arranged on the face of a baffle 2 made of insulating material and has a diameter which is smaller than the width of the baffle 2. The width of the baffle 2 is only slightly smaller than the width of the groove 4 to be made in the workpiece 3 connected at the other pole of the current source.

The required electrolyte liquid is introduced from an open end of the groove 4 into the work gap 6 formed by the electrode 1 and the material to be taken away. This electrolyte liquid flows through the work gap 6 in the longitudinal direction and thereby takes the material 5 to be removed with it. The electrolyte liquid is prevented from flowing away to the rear of the electrode 1 by the baffle 2. This ensures that the work gap 6 remains filled with electrolyte liquid during etching and the material 5 to be carried away is transported out of the work gap 6 with the electrolyte liquid.

We claim:

1. An apparatus for the electrochemical etching of a groove of very small width in a workpiece, comprising:
    an electrode extending across the workpiece in a direction selected for the etching of the groove and being capable of sinking into the workpiece to form a work gap therein; and
    a baffle means, arranged on top of the electrode, for extending over an entire working length of the electrode, said baffle means having a width corresponding to the very small width of the groove;
    whereby the work gap in the groove being etched electrochemically in the workpiece remains filled with an electrolyte liquid along the entire working length of the electrode and a flowing away of the electrolyte liquid takes place essentially in a longitudinal direction of the work gap.

2. An apparatus according to claim 1, wherein the baffle means is made of insulating material.

3. An apparatus according to claim 1, wherein the electrode has a circular cross-section.

4. An apparatus according to claim 3, wherein the electrode further has a diameter which is smaller than the width of the baffle means.

5. An apparatus according to claim 1, wherein the electrode further has a width which is smaller than the width of the baffle means.

6. An apparatus according to claim 1, wherein the electrode is capable of etching the groove to a width less than 1.0 millimeter.

* * * * *